(12) United States Patent
Jones et al.

(10) Patent No.: US 6,512,776 B1
(45) Date of Patent: Jan. 28, 2003

(54) METHOD AND APPARATUS FOR TRANSPARENTLY MULTICASTING IDENTICAL DATA STREAMS ORIGINATING FROM DIFFERENT OR COMMON SOURCES

(75) Inventors: Wesley Stuart Jones, Palatine, IL (US); Philip R. Roberts, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/097,337

(22) Filed: Jun. 15, 1998

(51) Int. Cl.⁷ .................................................. H04J 3/26
(52) U.S. Cl. ........................ 370/432; 370/473; 370/389
(58) Field of Search ................................ 370/432, 328, 370/338, 401, 402, 403, 404, 349, 389, 473; 709/203

(56) References Cited

U.S. PATENT DOCUMENTS

| | | | | |
|---|---|---|---|---|
| 5,404,447 A | * | 4/1995 | Drako | 395/162 |
| 6,011,782 A | * | 1/2000 | Desimone et al. | 370/260 |
| 6,181,697 B1 | * | 1/2000 | Nurenberg et al. | 370/390 |
| 6,023,734 A | * | 2/2000 | Ratcliff et al. | 709/300 |
| 6,108,706 A | * | 8/2000 | Birdwell et al. | 709/229 |
| 6,157,649 A | * | 12/2000 | Pierce et al. | 370/401 |
| 6,279,029 B1 | * | 8/2001 | Sampat et al. | 709/203 |

* cited by examiner

*Primary Examiner*—Steven Nguyen
*Assistant Examiner*—Duc Duong
(74) *Attorney, Agent, or Firm*—Paul F. Bawel

(57) ABSTRACT

A first data stream (26) requested by a first client (1) is received at a router (16). A second data stream (24) requested by a second client (2) is also received at the router (16). The router (16) determines that the first data stream (26) and the second data stream (24) are identical. The router (16) multicasts the first data stream (26) and the second data stream (24) into a single multicast data stream (28). The single multicast data stream (28) is transmitted to the first client (1) and to the second client (2).

22 Claims, 4 Drawing Sheets

—PRIOR ART—

METHOD AND APPARATUS FOR TRANSPARENTLY MULTICASTING IDENTICAL DATA STREAMS ORIGINATING FROM DIFFERENT OR COMMON SOURCES

FIELD OF THE INVENTION

The present invention relates to a method and apparatus for transparently multicasting identical data streams originating from different or common sources.

BACKGROUND OF THE INVENTION

In the Internet environment, multiple users access the same data relatively close to the same time. For example, popular web sites have hit rates which approach 200 hits per second (as described in Mansigian, Joseph, *Clearing the Traffic Jam at Internet Servers—A Network Layer View of Network Traffic Consolidation*, March, 1997). Many of the accesses are to the "main" or first page of a given web page, e.g., http://www.cnn.com, therefore multiple accesses or users can be served by one packet which is multicast to the multiple users. Such multicasting reduces the amount of traffic on the network links and effectively increases the aggregate bandwidth of the system. FIG. 1 shows an example of one source multicasting the same data to two separate clients inside the Internet. At the point where the routes to the clients diverge, the data packets are duplicated and sent to each client directly. The data packets are grouped as one as far through the network as possible, splitting when necessary to reach each client. As shown in FIG. 1, the solid black lines represent the combined/multicast route for clients 1 & 2. The dashed lines represent the route to client 1. The dotted lines represent the route to client 2 and the asterisk lines signify the unused routes. Not all servers connected to the Internet support multicasting of data packets. Network bandwidth is wasted by these servers when identical data packets are delivered to multiple clients.

There are services available which deliver streaming content to end users. Although much of this content is of the store and forward variety, many of the streams are made of live content. For example, one of the popular features offered by these services is the ability for Internet users to access sporting events which are not broadcast on radio or television in their local area. Multiple users in a given area may access the same live content, thus providing users with the ability to access numerous different sources within a local area and around the country. In such an example, two Internet users could actually be in the same neighborhood listening to the same sports broadcast, possibly a Purdue basketball game, and retrieving the same data from different sources. In this case, however, multicasting at the source level is not possible since the two users are accessing different sources.

Thus, a need exists for multicasting data for simultaneous receipt by multiple users when the multiple users are accessing different sources or when multiple users are accessing a single source which does not support multicasting.

BRIEF DESCRIPTION OF THE DRAWINGS

A preferred embodiment of the present invention is now described, by way of example only, with reference to the accompanying drawings in which.

DETAILED DESCRIPTION OF THE PREFERRED EMBODIMENT

A technique for multicasting user datagram protocol (UDP) packets or other packets at a router (wireless or wired) for simultaneous receipt by multiple users when the multiple users are accessing different sources (e.g., servers) is described herein. One of the unique features of this technique is that there is not a requirement that the sources of the data streams are the same in order for the data to be multicast. When the data streams are multicast, only one copy of the data stream needs to be sent, thus reducing the data transmitted by the router to the number of users accessing the same data. By using this multicasting technique, the effective throughput of the router is increased. The technique described herein is applicable for any subnet that supports a multicast capability within its datalink protocol.

Figure 1:
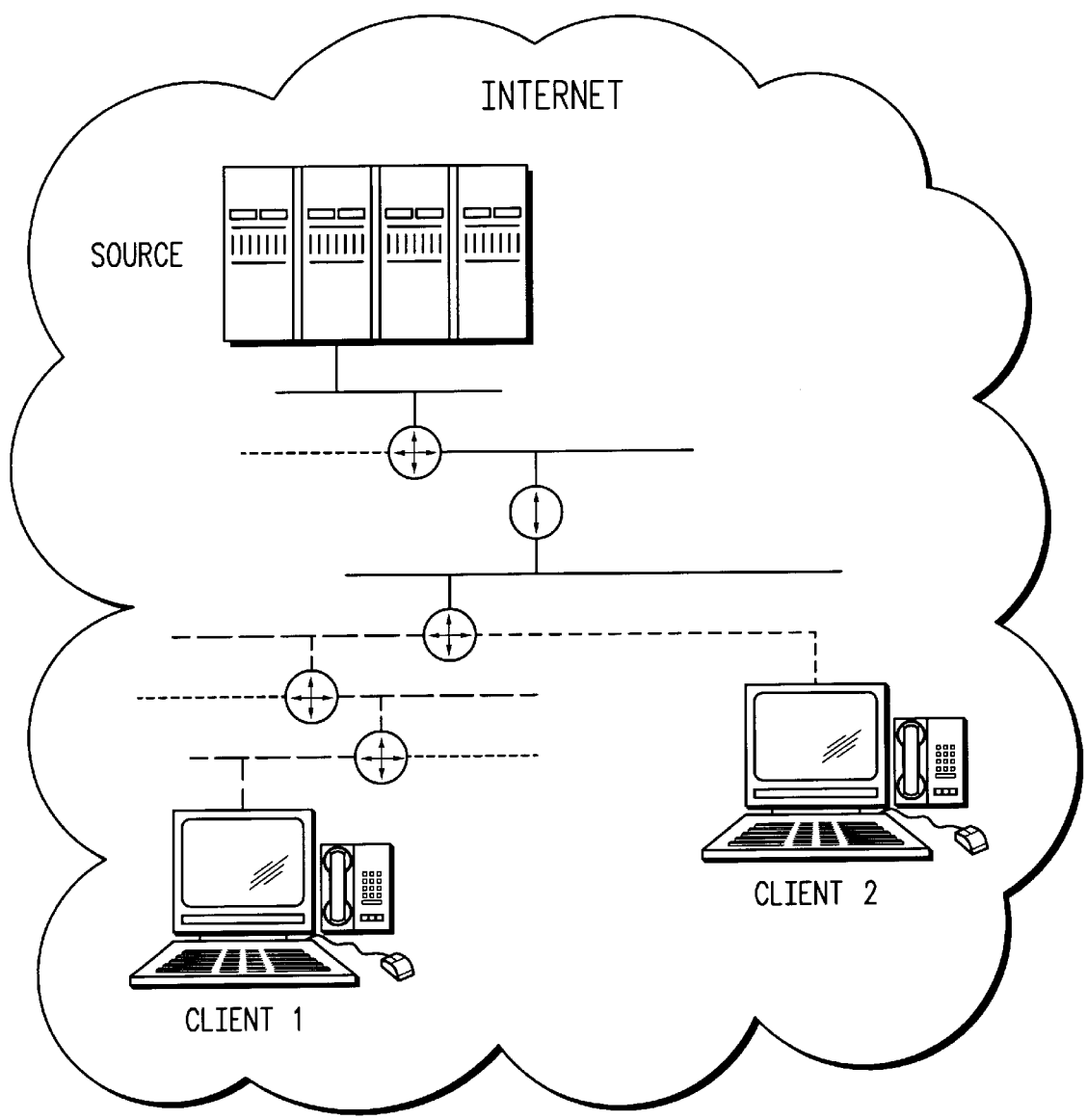
FIG. 1 (prior art) is a graphical depiction of a typical multicasting scenario where multiple users are accessing a single source which supports multicasting.
Figure 2:
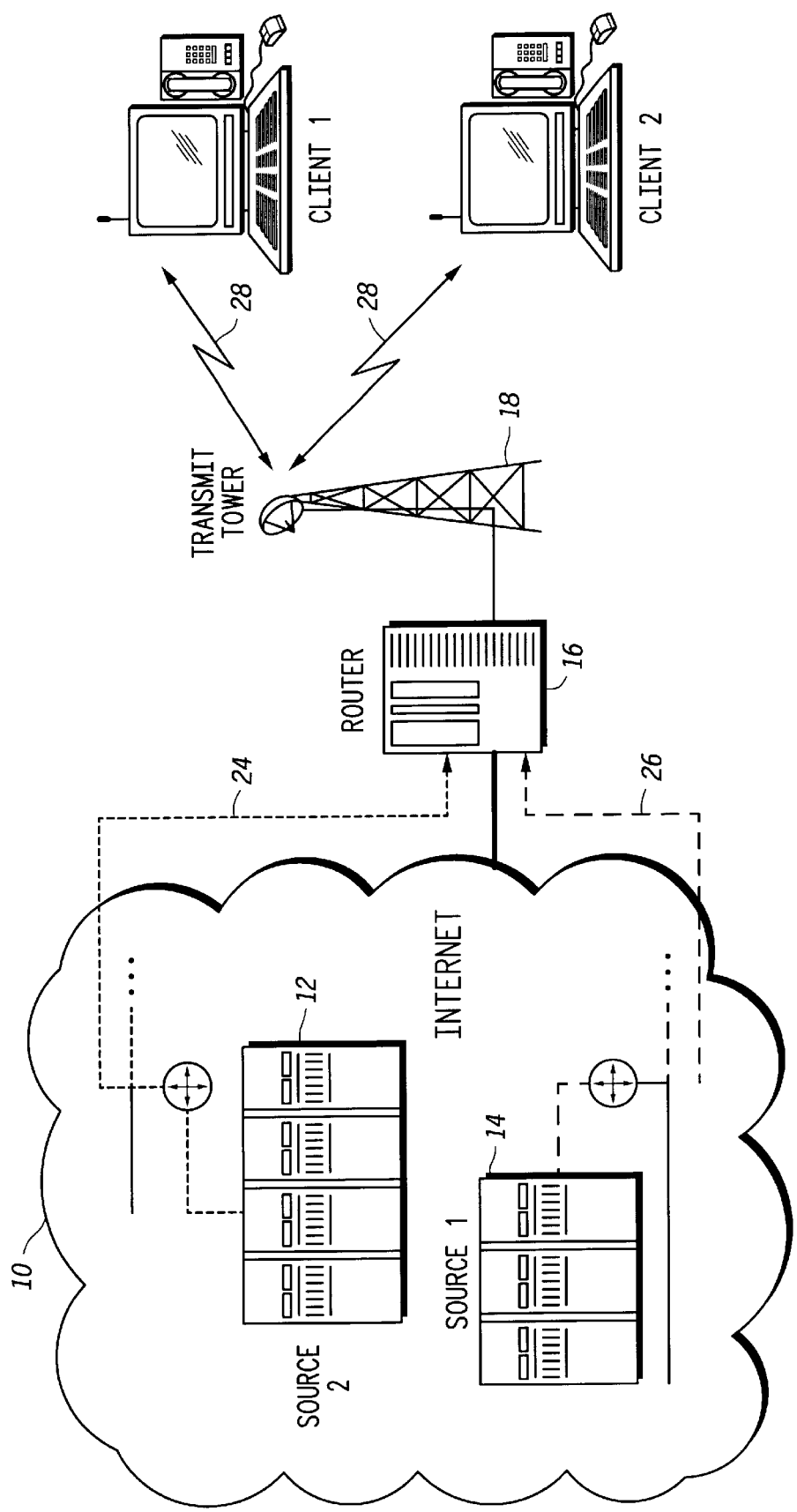
FIG. 2 is a graphical depiction of a result of multicasting two separate but identical streams of data at a router according to the preferred embodiment of the present invention.

An implementation of this technique according to the preferred embodiment of the present invention is based on four phases: (1) detection of identical UDP packets; (2) modification of header information for a multicast stream; (3) notification to the clients of the use of multicasting; and (4) delivery of the multicast stream to multicast users. FIG. 2 illustrates a system environment according to the preferred embodiment of the present invention. A network (e.g., the Internet) 10 having a plurality of sources 12, 14 which are in communication with a router 16. The router 16 is in communication with a plurality of clients/end users 1, 2 via a transmit tower 18. In this particular example illustrated in FIG. 2, client 1 accesses a first source 14 and client 2 accesses a second source 12. When two separate but identical data streams from the different sources 12, 14 or from a common source which does not support multicasting come to the router 16, the router 16 multicasts the data streams 24, 26 into one multicast transmission 28. Each data stream 24, 26 is comprised of a plurality of UDP packets. As will be explained in detail below, manipulation of the content of the UDP packets allows the router 16 to determine if the two separate data streams 24, 26 are identical.

Figure 3:
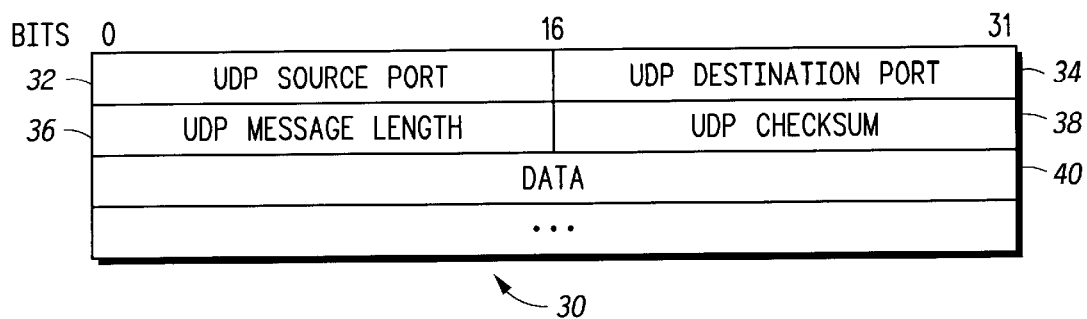
FIG. 3 is a block diagram of a format and fields of a user datagram protocol packet according to the preferred embodiment of the present invention.

In FIG. 3, the format and fields of the UDP packet 30 is shown (as described in Comer, Douglas E., *Internetworking with TCP/IP*, Volume 1, Prentice Hall, 1991). Bits 0–31 of the UDP packet 30 contains a UDP source port 32, a UDP destination port 34, a UDP message length 36, a UDP checksum 38 and data 40.

The router 16 searches for data streams where the UDP packets are identical, except for the header information (source and destination). If the UDP checksums 38, modified for the extraction of the per flow information, are identical, the data portion 40 of the UDP packets are identical. Thus, the UDP checksums 38 are modified so that only the data 40 in the UDP packets 30 are compared.

The UDP checksum 38 covers not only the UDP data 40, but also a UDP pseudo-header. The UDP pseudo-header is twelve bytes long and contains the source internet protocol (IP) address, the destination IP address, a zero byte, a protocol byte, and a UDP length field. The source and destination addresses and the protocol byte may be determined from the IP header. The length of the UDP checksum 38 is also contained in the UDP header. The zero byte is a no effect pad to facilitate sixteen bit one's complement addition.

Given the unique properties of the UDP checksum 38, computing the modified checksum is simple. The modified checksum is the old checksum minus the sixteen bit one's complement sum of the following fields: source IP address, destination IP address, zero byte, protocol byte, UDP length, source port and destination port.

The following pseudocode segment computes the modified checksum to be stored for the UDP packets that are to be compared to determine whether the contents are identical. Computationally, it is much more efficient to compute the modified checksum to be stored for the UDP packets that are to be compared than to compute a modified checksum over the whole UDP packet. For each UDP packet 30:

```
unsigned long sum=0;
unsigned short count=8;
addr=<start of IP addr+12>;
while ( count>1 )/* add in IP source and destination
    address */
{
    sum+=* (unsigned short) addr++;
    count-=2;
}
sum+=<protocol>; /* protocol byte 0 extended to 16 bits
    */
addr=<start of UDP packet within IP packet>;
count=6;
while (count>1) /* add in UDP source and dest. port, and
    msg length */
{
    sum+=(unsigned short) addr++;
    count-=2;
}
/* fold 32-bit sum to 16 bits */
while (sum>>16)
    sum=(sum & 0xffff)+(sum>>16);
storedchecksum=checksum-(~sum);  /* ~C
    =~(~C-m)=>~C₁=C-~m*/
```

This pseudocode is derived from two Internet Engineering Task Force (IETF) Request for Comments (RFC): Braden, Bouman, *Computing the Internet Checksum*, (RFC 1071) and Mallory, Kullberg, *Incremental Updating of the Internet Checksum*, (RFC 1141).

Once the UDP checksums are modified and stored, they are easily compared. The one's complement sum of identical numbers is all ones. If the source and destination ports 32, 34 are not operating system or application specific, they may be excluded from the above computation.

Figure 4:
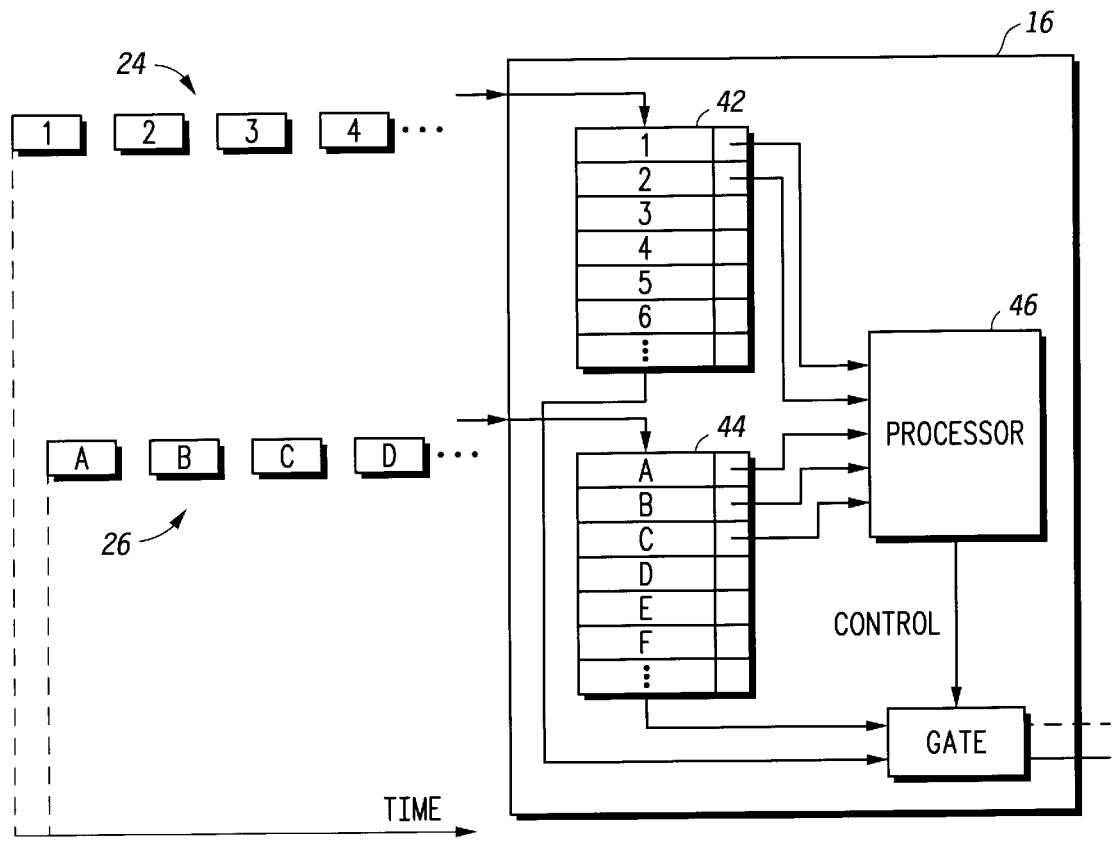
FIG. 4 is a graphical depiction of comparing checksums of two data streams according to the preferred embodiment of the present invention.

In order to detect identical data from different sources or from a common source which does not support multicasting, the router 16 stores the modified checksum values for a subset/window of packets (possibly five to ten packets) from each data stream in memory (e.g., a per destination list 42, 44) as shown in FIG. 4. It should be noted that it is possible that the data streams are offset in time. For example, UDP packets 24 from a first data stream are saved and later compared with UDP packets 26 from a second data stream.

A processor 46 is programmed to compare the modified checksum values of the first data stream with the modified checksum values of every other data stream stored in memory. In this manner, multicasting may occur on data streams which are offset in time. The pseudocode used to compare the modified checksums is as follows:

```
for counter=1 to x
    a[counter]=modified checksum of stream a
next
b[1]=modified checksum of stream b for counter=1 to x
    if b[1]=a[counter] then
        if b[2]=a[counter +1] then
            match=TRUE;
            break
next
if match=TRUE then streams are the same
``` where x is the number of datagrams to compare. The variable x varies depending on the system constraints. Once the data streams are compared, the processor 46 adds their modified checksum values. If the result of adding the modified checksum values together is 0xff (i.e., 16 bits all ones), then the checksums are identical and statistically speaking, the data streams are identical.

In the above pseudocode used to compare the modified checksums, two successive checksum matches indicate two identical streams. In practice, this number may be increased. Nesting the comparisons in the second "counter=" loop enables more than two comparisons. Thus, if there is a checksum match, other checksums for the same data stream are compared. Several matches indicate multiple identical streams.

Once the data streams are determined to be identical, the router 16 notifies the clients 1, 2 that the UDP packets from the data streams are replaced by a single multicast data stream 28 as shown in FIG. 2. The remaining UDP packets are sent to all users looking at the multicast data stream 28 through a data link layer multicast facility. The aforementioned notification configures the clients 1, 2 to use the data link layer multicast facility. The notification to the clients 1, 2 of the multicast data stream 28 is sent as a signaling message to all recipients of the same multicast data stream 28. Therefore, the clients 1, 2 monitor a media access control (MAC) address to receive their packets.

The clients' 1, 2 data link layer replaces the IP header from the multicast data stream 28 with the correct IP header for the clients' application. Data streams are received by the application exactly as it would have been without the multicast data stream 28. This involves replacing the destination address (and possibly the source address and the appropriate UDP port numbers) in the received IP header with the appropriate destination. This field must be saved from the setup message that signaled the switch to multicasting.

After identical data streams have been detected and multicast, a situation may arise where a client 2, who is part of such a multicast, may "change channels" by selecting a new data stream to access, either from a new or the same source/service. In the case of streaming content, this may be an on-line clip or an on-line audio. (This is the same as changing the play selection from the streaming source). Before the client 2 changes channels, the delivery looks like that shown in FIG. 2. Note that the asterisk top data stream 24 and the dashed bottom data stream 26 have identical checksums and so they are multicast into a single data stream 28.

Figure 5:
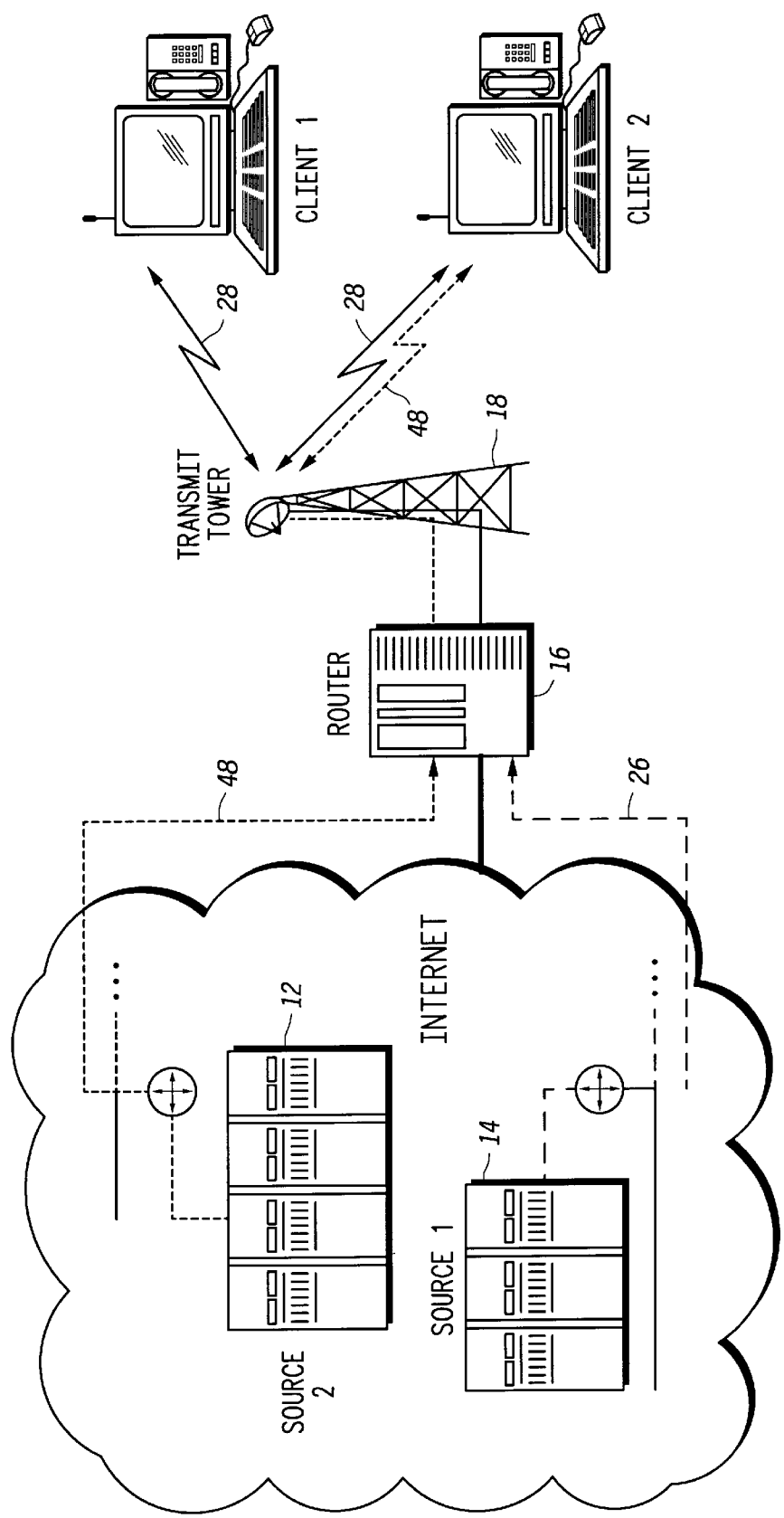
FIG. 5 is a graphical depiction of two clients receiving a multicast signal after one clients "changes channels" according to the preferred embodiment of the present invention.

Now, the client 2 of the asterisk top data stream 24 changes channels. This change in channel selection which causes the source 12 to stop sending the asterisk top data stream 24 and send the dotted data stream 48, as shown in FIG. 5. The router 16 detects the dotted data stream 48 as a new data stream and sends the dotted data stream 48 to the client 2. For a certain amount of time, the client 2 receives both the multicast data stream 28 (the asterisk data stream and the dashed data stream multicast) and the new dotted data stream 48. To avoid delivery of unwanted data to the client 2 which changed channels, a layer 2 signal is sent from the router 16 to the client 2 indicating that the client 2 should ignore the multicast as depicted in FIG. 5. Having the client 2 receive both the multicast data stream 28 and the dotted data stream 48 does not affect the aggregate bandwidth of the router 16 since the dashed data stream 26 is being sent anyway, i.e., client 1 is still accessing this data stream. If the asterisk data stream 24 is being used for the multicast stream 28, after client 2 changes selections, the router 16 needs to switch to the dashed data stream 26 as the source for the multicast. Thus, the router 16 must monitor each source stream for such a multicast configuration where one of the clients changes his channel selection. If after a certain interval the router 16 detects that no data stream is flowing from a source, the router 16 may delete the multicast delivery and return the delivery of the other data stream to the standard unicast mechanism.

An additional feature of this technique for multicasting is to always deliver the "best" quality data stream to the multicast clients 1, 2. Sending the "best" quality data stream could imply the lowest delay between packets, the lowest delay variation between packets, etc. All the streams that are combined into a single multicast data stream are buffered for a few packets and error rates and/or packet jitter are measured to determine which data stream has the "best" quality. When multiple identical data streams are being received and sent on as a multicast data stream by the router 16, some clients (e.g., client 1) will benefit by receiving data from the "best" data stream (i.e., the data stream accessed by client 2).

While the invention has been described in conjunction with a specific embodiment thereof, additional advantages and modifications will readily occur to those skilled in the art. The invention, in its broader aspects, is therefore not limited to the specific details, representative apparatus and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method for multicasting identical data streams, wherein each data stream is comprised of a plurality of packets, at a router for simultaneous receipt by multiple users comprising, at the router:

receiving a first data stream requested by a first client;

receiving a second data stream requested by a second client;

determining that the first data stream and the second data stream are identical;

multicasting the first data stream and the second data stream into a single multicast data stream; and transmitting the single multicast data stream to the first client and to the second client.

2. The method according to claim 1 wherein the first data stream originated from a first source and the second data stream originated from a second source, wherein the first source and the second source are different.

3. The method according to claim 1 wherein the first data stream and the second data stream originate from a common source which does not support multicasting.

4. The method according to claim 1 wherein the router is wireless.

5. The method according to claim 1 wherein the router is wired.

6. The method according to claim 1 wherein the step of multicasting the first data stream and the second data stream involves transmitting a data stream which has a higher quality value, wherein quality value is determined by buffering each data stream for a plurality of packets and measuring at least one of the following: error rates and packet jitter.

7. The method according to claim 6 wherein the data stream which has the higher quality value has a lower delay between packets than other identical data streams being multicast.

8. The method according to claim 6 wherein the data stream which has the higher quality value has a lower delay variation between packets than other identical data streams being multicast.

9. The method according to claim 1 further comprising notifying the first client and the second client that data received is multicast.

10. The method according to claim 1 further comprising:

receiving a third data stream in replace of the first data stream; and sending the first client the single multicast data stream and the third data stream.

11. The method according to claim 10 further comprising:

transmitting a signal to the first client indicating that the first client should ignore the single multicast data stream.

12. The method according to claim 10 further comprising:

after a predetermined period of time, unicasting the third data stream to the first client; and unicasting the second data stream to the second client.

13. The method according to claim 1 further comprising:

detecting that a source of the first data stream has not transmitted any data streams for a predetermined period of time;

ceasing transmission of the single multicast data stream; and unicasting the second data stream to the second client.

14. A method for comparing multiple data streams, wherein each data stream comprises a plurality of packets and each packet has a checksum, at a router comprising:

receiving a first data stream at a first time;

modifying each checksum in the first data stream to create a first plurality of modified checksum values;

storing the first plurality of modified checksum values for a window of time in a first memory;

receiving a second data stream at a second time;

modifying each checksum in the second data stream to create a second plurality of modified checksum values;

storing the second plurality of modified checksum values for a window of time in a second memory; and comparing the first plurality of modified checksum values with the second plurality of modified checksum values to determine if the first data stream is identical to the second data stream.

15. The method according to claim 14 wherein the step of comparing further comprises offsetting in time the first plurality of modified checksum values with the second plurality of modified checksum values.

16. The method according to claim 14 wherein the step of comparing further comprises adding the first plurality of modified checksum values to the second plurality of modified checksum values, wherein if a result of adding the first plurality of modified checksum values with the second plurality of modified checksum values is 0xff then the first data stream is deemed identical to the second data stream, otherwise the first data stream is deemed different from the second data stream.

17. An apparatus for multicasting data streams comprising:
   a network having a plurality of sources; and
   a router coupled to the network operable to:
      receive data streams from the plurality of sources; and
      multicast identical data streams into a single multicast transmission for simultaneous receipt by multiple users, wherein the identical data streams multicast by the router originate from a common source which does not support multicasting.

18. The apparatus according to claim 17 wherein the router is wired.

19. The apparatus according to claim 17 wherein the router is wireless.

20. The apparatus according to claim 17 wherein the identical data streams multicast by the router originate from different sources.

21. An apparatus for comparing multiple data streams, wherein each data stream comprises a plurality of packets, at a router comprising:
   a first memory for storing a modified checksum value for each packet received from a first data stream;
   a second memory for storing a modified checksum value for each packet received from a second data stream; and
   a processor, coupled to the first memory and to the second memory, programmed to compare the modified checksum values from the first data stream with the modified checksum values from the second data stream and add the modified checksum values from the first data stream with the modified checksum values of the second data stream to determine if the first data stream is identical to the second data stream.

22. The apparatus according to claim 21 wherein the processor is further operable to offset in time the modified checksum values of the first data stream with the modified checksum values of the second data stream.

* * * * *